US007853825B2

(12) United States Patent
Varadarajan et al.

(10) Patent No.: US 7,853,825 B2
(45) Date of Patent: Dec. 14, 2010

(54) METHODS AND APPARATUS FOR RECOVERING FROM FATAL ERRORS IN A SYSTEM

(75) Inventors: Keshavan Varadarajan, Bangalore (IN); Ranjani Narayan, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 794 days.

(21) Appl. No.: 11/492,842

(22) Filed: Jul. 26, 2006

(65) Prior Publication Data

US 2007/0043975 A1  Feb. 22, 2007

(30) Foreign Application Priority Data

Aug. 16, 2005  (IN) ........................ 1142/CHE/2005

(51) Int. Cl.
*G06F 11/00* (2006.01)
(52) U.S. Cl. ............................. 714/11; 714/10; 714/13; 714/15; 714/23; 718/102
(58) Field of Classification Search .................. 714/2, 714/25, 26, 38, 43, 9, 44, 11, 13, 15
See application file for complete search history.

(56) References Cited

U.S. PATENT DOCUMENTS

| | | | | |
|---|---|---|---|---|
| 6,065,135 A * | 5/2000 | Marshall et al. | ................ | 714/11 |
| 6,516,429 B1 * | 2/2003 | Bossen et al. | ................. | 714/47 |
| 6,523,140 B1 * | 2/2003 | Arndt et al. | .................... | 714/44 |
| 6,647,408 B1 * | 11/2003 | Ricart et al. | ................ | 718/105 |
| 7,305,582 B1 * | 12/2007 | Moser et al. | ................... | 714/13 |
| 7,373,558 B2 * | 5/2008 | Mukherjee | .................. | 714/48 |
| 7,380,169 B2 * | 5/2008 | Fossum et al. | ................ | 714/36 |
| 7,516,361 B2 * | 4/2009 | Vick et al. | .................... | 714/15 |
| 7,519,975 B2 * | 4/2009 | Lal | ............................. | 719/318 |
| 2002/0040411 A1 * | 4/2002 | Iwatani et al. | .................. | 710/2 |
| 2002/0062459 A1 * | 5/2002 | Lasserre et al. | ............... | 714/10 |
| 2002/0186407 A1 * | 12/2002 | Laughlin | ................... | 358/1.15 |
| 2003/0140281 A1 * | 7/2003 | Fu et al. | ....................... | 714/38 |
| 2004/0107304 A1 * | 6/2004 | Grun | .......................... | 710/36 |
| 2004/0111511 A1 * | 6/2004 | Maeda et al. | ............... | 709/224 |
| 2004/0186904 A1 * | 9/2004 | Oliveira | ...................... | 709/225 |
| 2004/0221189 A1 * | 11/2004 | Quach et al. | .................... | 714/2 |
| 2005/0028039 A1 * | 2/2005 | Henderson et al. | ............ | 714/42 |
| 2005/0210472 A1 * | 9/2005 | Accapadi et al. | ............ | 718/105 |
| 2006/0004860 A1 * | 1/2006 | Liedes et al. | ............. | 707/104.1 |
| 2006/0026381 A1 * | 2/2006 | Doi et al. | .................... | 711/207 |
| 2006/0059389 A1 * | 3/2006 | Hatamori | ...................... | 714/32 |
| 2006/0075300 A1 * | 4/2006 | Mukherjee | ................... | 714/38 |
| 2006/0075301 A1 * | 4/2006 | Fossum et al. | ................ | 714/38 |
| 2006/0143500 A1 * | 6/2006 | Hogdal et al. | .................. | 714/5 |
| 2006/0143512 A1 * | 6/2006 | Jia et al. | ....................... | 714/13 |
| 2006/0253740 A1 * | 11/2006 | Ritz et al. | ..................... | 714/38 |

(Continued)

*Primary Examiner*—Scott T Baderman
*Assistant Examiner*—Chae Ko

(57) ABSTRACT

Fatal errors are uncorrectable errors in hardware, which cause entire applications to be restarted and at worst can cause machine reboots. A method of recovering from a fatal error in a system having a plurality of components, in which the system includes a processor for executing a plurality of processes, comprises detecting an error in the system, determining which of the components caused the error, isolating processes affected by the error and recovering from the error. Assistance in error recovery can be provided by designing processes using check pointing, in which a back up of data pages is taken at predetermined points in a process, so that minimal loss of transactions occurs in the case of a fatal error.

14 Claims, 3 Drawing Sheets

U.S. PATENT DOCUMENTS

2007/0011581 A1* 1/2007 Nakanishi et al. ........... 714/768
2007/0016701 A1* 1/2007 Siorek et al. .................. 710/62
2007/0061612 A1* 3/2007 Henderson et al. ............. 714/5

* cited by examiner

METHODS AND APPARATUS FOR RECOVERING FROM FATAL ERRORS IN A SYSTEM

This application claims priority from Indian patent application IN1142/CHE/2005, filed on Aug. 18, 2005. The entire content of the aforementioned application is incorporated herein by reference.

BACKGROUND OF THE INVENTION

A fatal error can be defined as an error that causes a loss in service due to failure in a hardware component. The loss in service may be temporary, for example as a result of transient errors in the system. A fatal error can also be defined as an uncorrectable error in hardware, which simply means an error that cannot be corrected at a particular moment in time. Fatal errors often result in the entire system rebooting, so not allowing the opportunity for a user to recover from the error.

Known systems provide various levels of error handling. For example, in the HP-UX operating system running on the HP-PA RISC platform, errors that need immediate attention are dealt with by the High Priority Machine Check (HPMC) handler. Program code referred to as the OS_HPMC routine can be called to perform error logging and recovery. The purpose of this routine is essentially to perform a system dump and to perform whatever recovery is possible.

However, existing systems do not demonstrate a full self-healing ability in the presence of fatal errors.

BRIEF DESCRIPTION OF THE DRAWINGS

Embodiments of the invention will now be described by way of example only with reference to the drawings in which.

DETAILED DESCRIPTION OF EMBODIMENTS OF THE INVENTION

Figure 1:
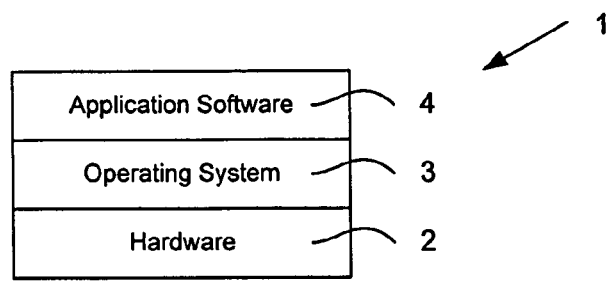
FIG. 1 is a schematic overview of a conventional computer system 1.

According to an aspect of the technique disclosed, there is provided a method of recovering from a fatal error in a system having a plurality of components, the system including a processor for executing a plurality of processes, the method comprising receiving information relating to an error in the system, determining which of the components caused the error, isolating processes affected by the error, and recovering from the error. By providing an error recovery system, user processes affected by the system can continue execution with minimal loss, and recovery is transparent to the user, in other words, occurs without user intervention and without resulting in a machine re-boot.

The method may further comprise determining which of the plurality of executing processes are affected processes. Different types of error may result in different actions in determining affected processes. For example, where the error is in the processor, the method may comprise simply disassociating all processes assigned to the processor. Where the error is in memory or an I/O device, affected processes can be determined by looking up the address location of the memory error or the list or processes queuing for service from the I/O device, respectively. In the case of processor error, the method may comprise saving the context of a currently running process, saving the state of processor registers, suspending the currently running process and saving the state of the processor at the point of suspension, following which the processor can be deactivated. In the case of a multi-processor system, the method may comprise moving the processes assigned to the faulty processor to another processor.

Following suspension of a process due to a processor, memory, I/O or other error, the process can be restarted. In the event that the process is designed using check pointing, the step of restarting the suspended process may comprise restarting the process from a last saved check point. By using check pointing in process design, the impact of a system error may be minimised so that the error may result in the loss of only a single transaction.

According to another aspect of present technique, there is further provided an error handler for recovering from a fatal error in a system having a plurality of components, the system including a processor for executing a plurality of processes and means for detecting an error in the system, the error handler comprising means for determining which of the components caused the error, means for isolating processes affected by the error and means for recovering from the error.

According to yet another aspect of the technique disclosed, there is also provided a computer program, which when executed on a processor, is arranged to perform error handling for recovering from a fatal error in a system having a plurality of components, the system including at least one processor for executing a plurality of processes and an error detection module for detecting an error in the system, the program comprising an error determining module for determining which of the components caused the error, an error isolating module for isolating processes affected by the error and an error recovery module for recovering from the error.

According to still another aspect of the technique disclosed, there is further provided a method of designing a process for running on a processor, wherein the process has an initialised state and an execution state, the execution state comprising a plurality of transactions, the method comprising inserting a check point between the initialised state and the execution state such that a failure during execution of the process results in the loss of a single transaction.

A transaction may include a program code portion that is capable of modifying data external to the transaction, and the method may further comprise inserting a check point into the program code portion. The program code portion may comprises a loop, the method comprising inserting a check point into the loop.

To assist in preventing loss of more than one transaction due to a system failure, check points may be inserted at boundaries between the plurality of transactions. For example, where the transactions include multiple non-nested loops, the method may comprise inserting a check point between the loops.

A check point may comprises a back-up of data pages associated with the process. A first check pointing operation may comprises a back-up of all data pages while subsequent check pointing operations take a back-up of modified pages only. Check points may in themselves be implemented as transactions, so that in the event that a check point insertion fails, the method may comprise rolling back the insertion to the previous check point.

Figure 2:
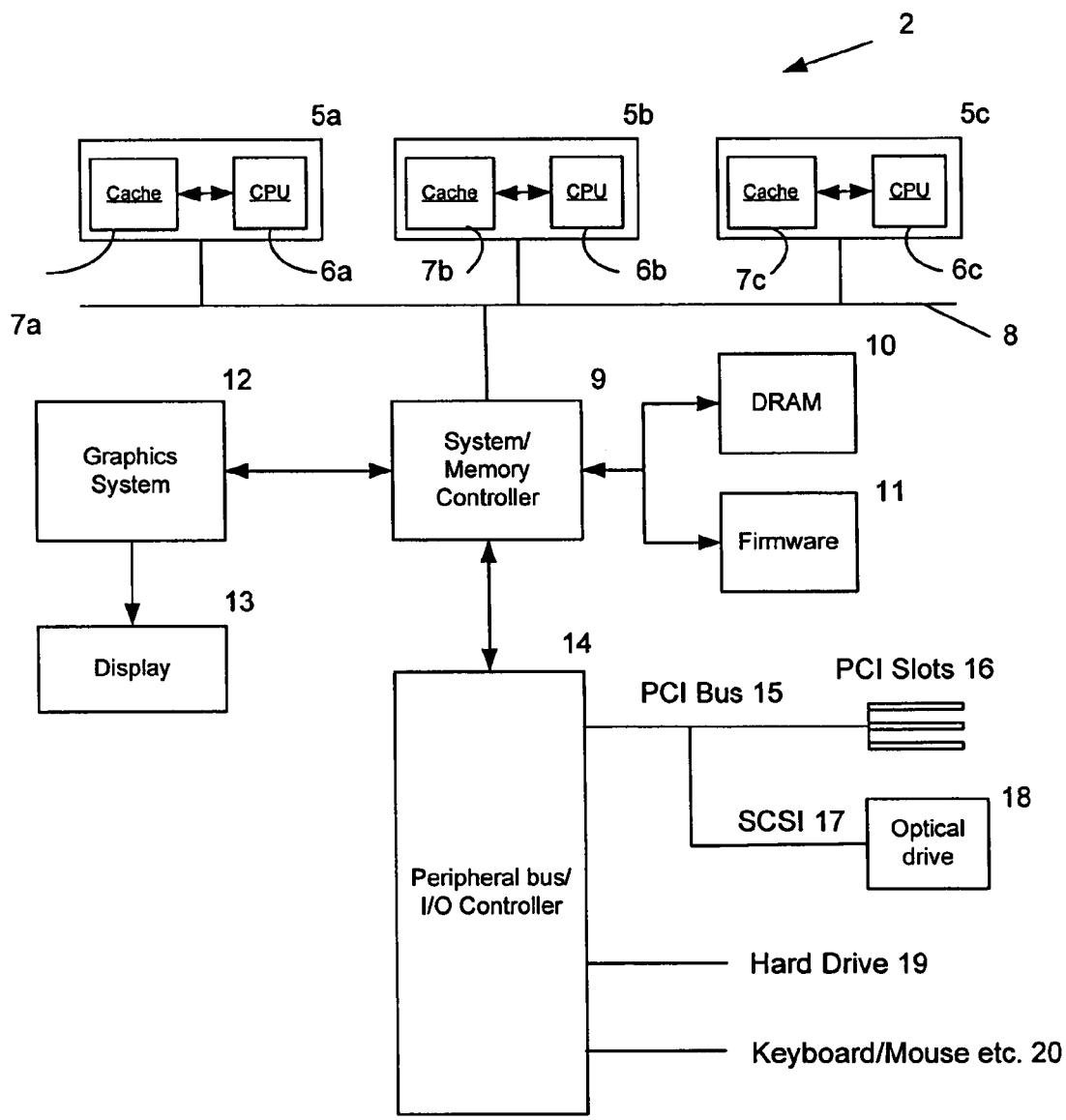
FIG. 2 is a schematic diagram of the hardware of the computer system 1 shown in FIG. 1.

FIG. 1 illustrates the structure of a computer system 1 that generally comprises a hardware level 2, operating system software 3, for example software such as HP-UX™ or a Microsoft Windows™ based operating system such as Windows XP™, and an application software level 4 running user specific application programs. The hardware 2 of an example multi-processor based computer is shown schematically in FIG. 2. The computer includes a number of processor modules 5a, 5b, 5c, each of which include a CPU 6a, 6b, 6c connected to a cache memory 7a, 7b, 7c. The processor modules 5a, 5b, 5c are further connected via a local bus 8 to a system/memory controller 9 that deals with access to a physical memory 10, for example in the form of dynamic RAM (DRAM), and controls access to system firmware stored, for example, in non-volatile RAM 11, as well as controlling the graphics system 12, which is connected to a display 13. The system/memory controller 9 is also connected to a peripheral bus and input/output (I/O) controller 14 that provides support for other computer subsystems including peripheral devices, I/O devices and so on. This includes, for example, a PCI bus 15 that supports a plurality of PCI slots 16 into which PCI components can be inserted, as well as a PCI SCSI interface 17 for connection to devices such as optical drives 18. It also includes support for hard drives 19 via, for example, an ATA or SATA interface and connections to conventional input/output devices 20 such as a keyboard, mouse and so on.

Figure 3:
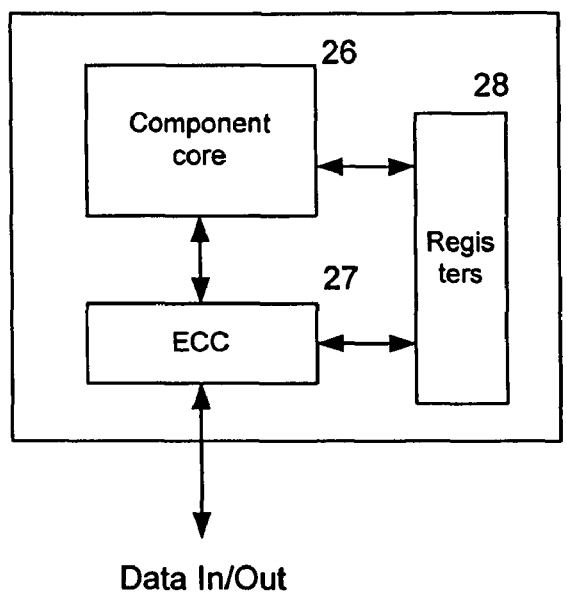
FIG. 3 is a schematic diagram of an ECC protected component.

As illustrated in FIG. 3, each component 25 in the above described system comprises a component core 26, which implements the main functionality of the component, for example memory, together with an integral error correcting circuit (ECC) 27 which provides for detection of multi-bit errors, as well as correction of single bit errors. As a result, the ECC hardware 27 protects all data entry/exit points. ECC protected components are well known in the art. The component 25 further comprises error registers 28 to keep track of errors.

Figure 4:
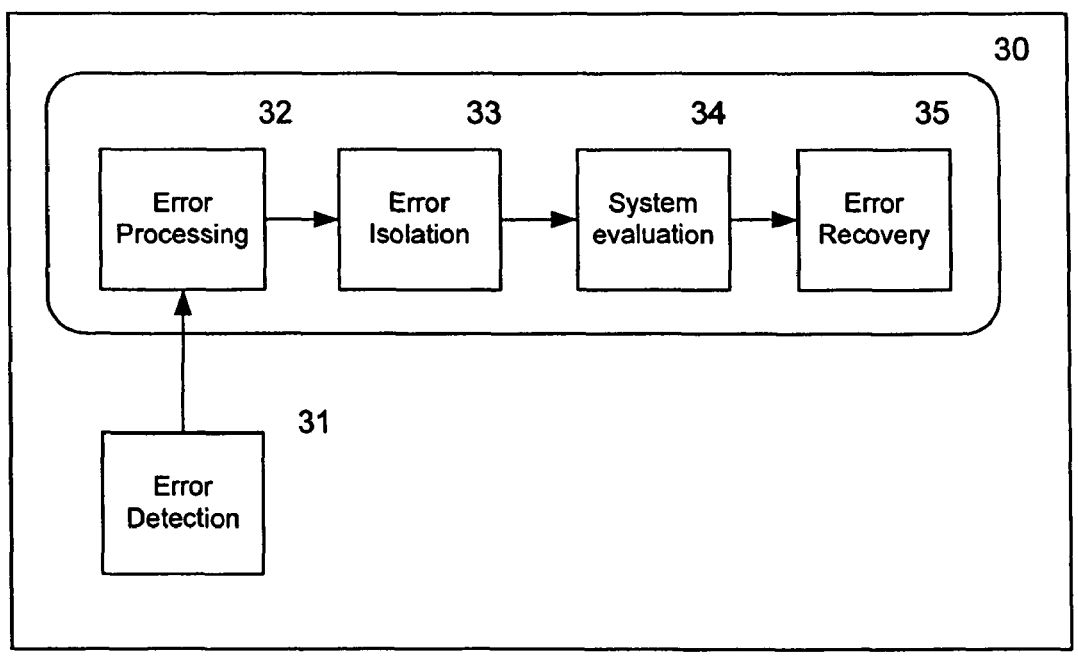
FIG. 4 is a schematic diagram of an error recovery system according to an embodiment of the invention.

An error recovery system, also referred to herein as an error handler, is schematically shown in FIG. 4. The error handler 30 is a program that receives error detection information from a plurality of hardware error detection modules 31, such as the ECC module 27 shown in FIG. 3. The error handler 30 comprises a plurality of software modules, including an error processing module 32, an error isolation module 33, a system evaluation module 34 and an error recovery module 35. The functionality encompassed by each of these modules will now be described in detail below.

Error Detection

All errors on a system can be broadly classified into processor errors, memory errors, I/O device errors and platform specific errors. Processor errors are primarily due to cache errors occurring in the cache associated with the processor. However, they can also include other types of errors such as floating point errors. Memory errors include single, double and multi-bit errors depending on the platform. I/O device errors include errors such as PCI card failure, PCI bus failure and so on. Platform specific errors include errors that are specific to a particular hardware platform.

The error detection module 31, also referred to as an error capture module, is a module implemented in hardware for detecting the errors set-out above.

The method of capturing fatal errors is very platform specific. A general method such as a very high priority interrupt can be used to indicate failure and a suitable interrupt handler can be registered for this interrupt. For example, as mentioned above, on the HP-UX operating system running on an HP-PA RISC platform, the interrupt handler is implemented as the OS High Priority Machine Check (HPMC) handler. In another example, on HP Integrity platforms, the System Abstraction Layer (SAL) allows for the registration of an OS Machine Check Abort (MCA) handler that will be invoked in the case of an MCA condition. The SAL allows this OS_MCA handler to recover the machine, but if the OS_MCA handler fails to do so the machine goes down. On the Windows platform, there are calls exported from the Hardware Abstraction Layer (HAL) to register a handler for machine check abort. All of the above mentioned operating system handlers are automatically invoked in case of an HPMC or MCA event.

Error Processing

Once the error has been captured, it can be processed. Processing includes error analysis, which determines the type of error, for example processor, memory or I/O device error and the processes that are affected or potentially affected by the error. The firmware is capable of determining the component at fault and returning this data to the operating system.

As explained above in relation to FIG. 3, ECC hardware 27 protects all data entry/exit points in a component. Errors are held in the error registers 28. The firmware 11 periodically polls these registers to determine if an error has occurred.

In the case of a fatal error a high priority interrupt is raised. This interrupt is directly handled by the system firmware 11, not the operating system, and it determines the component which raised the alarm. Based on the component error register records previously retrieved, the firmware can identify the faulty component.

Isolating Processes

Once the type of error has been determined, the error isolation module 33 looks to isolate the affected processes. A process is essentially a program running on a processor. The isolation method differs for each type of error.

Isolating Processes for Processor Errors

In the case of a faulty processor, the following steps are taken to isolate processes affected by the fault:

1) All processes assigned to the faulty processor need to be disassociated from it. In general terms, a process queued on a faulty processor may or may not be considered affected depending on whether the process is bound to the processor or not. For example, certain programs can indicate that they need to run on a specific processor only. However, the error processing system 30 cannot determine this, so that even these processes are considered for this purpose to be affected processes and are added to a separate queue of affected processes.

2) Next, the context of the currently running process is saved and the processor also takes a snap-shot of the processor's registers at the point of failure. The processor faults occur on the processor's cache lines, rather than in the registers or processing core, so that the processor maintains sufficient functionality to save the state of the registers. However, keeping the processor alive could cause further damage in terms of repeated uncorrectable errors and stalls in service.

3) The process running on the processor is suspended and the state of the processor at the point of suspension is saved to the process control block, which is an operating system structure that represents the process. It includes, for example, the process id, the process state, the registers and program counter, memory information, a list of open files, inter-process communication information, accounting information and pointers to other data structures in the operating system.

4) The faulty processor can then be deactivated. Deactivation is the process of removing the processor from operating system data structures. The operating system ensures that processes and threads are not scheduled on that particular processor. In addition, the processor is marked as "bad" so that on the next boot, the faulty processor is removed from the system configuration.

Isolating the Process for Memory Errors

In common with other operating systems, the HP-UX system uses a virtual memory management system in which the physical address space on the system is mapped to portions of a much larger virtual address space. The operating system maintains a table in memory called the page table, which keeps track of all virtual pages currently in physical memory, for example, in RAM. The page table links a virtual address to a physical page in memory for each process. A page is the smallest contiguous block of physical memory that can be allocated for storing data and code. The page size on HP-UX systems is 4 kB.

In the case of memory errors, to determine the affected processes, the physical address location of the faulty memory is first determined. This address is then used to determine the virtual address and the associated process from the page table.

In an alternative example, the operating system maintains an inverted page table, which maps a physical page number to a virtual page number and process identifier. The determined physical address location can then be used to determine the virtual address and the process identifier from the inverted page table.

In the case of shared pages, all the processes sharing the page may be considered as affected processes.

To ensure that the operating system cannot access the faulty page, the page is removed. This can be implemented in hardware or software. For example, the virtual memory manager removes the page from the page directory and notes that no virtual page should be mapped to the de-allocated page. A technique to make a list of bad pages persistent is needed, so that a bad page is not accessed on subsequent boot. For example, a page deallocation table is held in non-volatile RAM 11, which is read by the virtual memory subsystem when the operating system boots up. The page deallocation table contains an entry for each memory page that has been deallocated, at some point in time, due to an error.

Isolating the Process for I/O Device Errors.

To determine the processes that are affected by an I/O component failure, the device queue for the specific device that failed needs to be accessed. It is assumed that the operating system has a queue for the list of processes waiting to be serviced by the I/O device. Alternately, any other technique available to determine the processes waiting for service from the I/O device may be used. In the case of a PCI bus failure, where the bus supports multiple PCI cards, all the processes waiting to be serviced by all of the cards available on the PCI bus are suspended. For example, on the HP-UX operating system, in the case of PCI bus failure or PCI component failure the "Prepare to replace" step of the PCI 'olrad' command on the PCI card is initiated. This gives a list of all the applications waiting or dependent on the card for service. For example, running the olrad command with the option '-C slot_id', where slot_id specifies the location of the PCI card, runs a critical resource analysis routine (CRA) only on the specified slot_id and displays the results. It checks for critical resources on all affected hardware paths associated with the specified slot. It analyzes file systems, volumes, processes, networking, swap, and dump and generates a report of affected resources. In the case of PCI bus failure, each of the individual slots supported by the bus is isolated by repeatedly using this technique. Once the processes are isolated, the I/O device can be deactivated. The processes are suspended, which assists in containment of the error, and are queued separately, so that the recovery handlers can do their processing in order to restore the process. Separate queuing means that the processes are isolated from the rest of the system, rather than being added to existing OS queues or queues used by the OS to suspend processes.

If the error recovery system 1 cannot determine the error or isolate the affected processes, then it indicates failure, which leads to the operating system being brought down forcefully.

Finally, the evaluation module 34 evaluates the system after the faulty hardware has been decoupled from the rest of the system. It determines whether the system is in a state that can continue operation despite the failure. For example, the operating system cannot recover if a fault is detected in the PCI SCSI interface that connects the primary disk to the system when there are no alternate paths to this disk. A detailed analysis may not be required, since in the case of failures such as primary disk failures, the operating system may not resume, since accesses to the disk would hang the system. In this embodiment, if the faulty component is successfully isolated, then the operating system continues.

After these decisions have been taken, control returns to the operating system and allows the operating system to continue normal operation. The recovery handlers are executed by the operating system, along with other unaffected processes, in order to recover the affected processes.

Error Recovery

The recovery handlers 35 perform the error recovery. The recovery handlers act upon the affected processes list and try to determine the cause of the problem and recover, as set out in more detail below. In most cases the damage done to the process is irreparable, so the only solution is to shut down and restart the process. Processes can be specifically designed in order to minimise or limit the damage by implementing a check-pointing procedure, as will be described in detail below. Essentially, a process is saved at a series of check points so that, in the event of a system failure, the process can be restarted from the last saved check point.

Recovery From Processor Error

Processor errors are mainly due to hardware failure such as multi-bit cache errors and processor bus errors. All of these errors affect the system as a whole and not just a single process. As explained above, the faulty processor generally needs to be deactivated. However, in processors that support fail-over cache lines, if the fatal error is due to a multi-bit error in the cache, then the fail-over cache line can be activated after deactivating the affected cache line. This will not bring down the computing power of the system.

For process recovery, all the processes that were scheduled on the bad processor are moved to another processor, except for processes that requested to be specifically scheduled on the affected processor. These are shut down and restarted. The process that was executing on the processor when the fatal error occurred can be recovered by going back to the last check point, if check-pointing is enabled, as will be discussed in detail later. The processes that do not have process checkpointing enabled need to be restarted.

Recovery from Platform Memory Error

As explained above, the page on which the multi-bit error occurred is de-allocated, i.e. the page is marked as bad so that the operating system does not use the affected page. The next step is to recover the process from this failure. If process check-pointing is implemented, then the following steps can be used to recover from errors, referring to FIG. 5. First, the system determines the address of the faulty page from the error data structures (step s1). Then the system determines whether the page is a code page, a data page or an I/O page (step s2). One way to determine this is using the attributes of the page. If the page is read-only then it is a code page, else it is a data page. This aspect is OS specific and any other suitable method can be used to determine this depending on the operating system being used. If the page is determined to be a code page, then the program is reloaded into a different area of the RAM from disk (step s3). The page table is updated to reflect this change (step s4) and the process is then restarted from the last saved check point (step s5). If the page is a data page, the system determines whether the read-call or the write-call failed (step s6). If the read-call failed, the faulty pages are de-allocated (step s7) and the data page from the previous check point is copied to a new location (step s8). The page table is again changed to indicate a change in the page location (step s4) and the process is restarted from the last saved check point (step s5). If the write-call has failed, this failure should have been caught by the ECC check at the memory controller, if the memory controller has this capability, so the error recovery procedure does not handle this and simply terminates (step s9).

If the page is an I/O page, then the process is restarted or the virtual memory manager is permitted to handle this situation (step s10). If the process has a signal handler for some termination signal then, instead of killing the process, the process is allowed to execute the signal handler so that it can gracefully exit and restart again. However care must be taken in the signal handler not to access I/O pages, data pages and so on. In addition, no assumption must be made on the availability of a CPU, disk or any other hardware. Creation of such a signal handler can be done for an existing signal or a new signal can be created in Unix.

When the faulty page is a shared memory page used by processes for Inter Process Communication (IPC), we cannot determine when the IPC actually began, so that all processes have to be restarted. If the processes are well designed, then the loss when we restart the processes will not be large.

Recovery from Platform PCI Bus Error and Platform PCI Component Error

Just as in the case of recovery from processor errors, the solution for recovery from this type of error is to de-configure the hardware. In order to de-configure the hardware, a pseudo PCI delete operation is performed. When a PCI bus error occurs, all the PCI cards on that bus have to be deleted. For a PCI component error only the component is deleted. This kind of solution of disabling cards may cause major problems if the primary network card of the machine is de-configured or if the PCI SCSI interface connecting the machine to the primary disc is de-configured.

When a process depends on a particular PCI interface or a peripheral connected to the PCI interface, it is not possible to continue the running of the process without that resource. The only way the operation can be continued is if there is an alternate path to the resource. If the resource is a network, then a solution such as Auto-port aggregation can be used. Auto-port aggregation is a feature in the HP-UX operating system that allows multiple network cards to export only one IP address. When one of the network cards goes down, the other network card takes over and continues to provide the service. When the end-resource is a storage device then a technique that allows multiple paths needs to be used; for example, the HP StorageWorks Secure Path™ product offers this functionality.

Design of Processes in Order to Minimise Damage Due to Fatal Errors

Every process has a start step, an initialised step, a main executing step and finally an exit step. State A, 100 in FIG. 5 marks the end of the initialisation step and the beginning of the main execution of the process. A process is in its cleanest state at the end of State A. In order to minimise losses, there is a mandatory check point state, State B 110 in FIG. 5, just after initialisation. States C 120 to Z 130 depicts the main body of the process. Any failure before the start of execution of State B will require the process to be restarted. There is no major loss encountered in such cases, since the process would have just started execution. Because of the mandatory check point at State B 110, any failure during the execution of the main body (states C to Z), will result in the loss of just one transaction. A transaction is essentially a set of operations in the process that must either be executed in its entirety or not at all.

The process execution should in such a case roll back by one transaction and resume. This is true if no historic information is needed during states C to Z, i.e. nothing apart from the transaction data is modified during the entire loop. But in the case of global variables, loop variables and other variables that are external to the transaction, any update to these variables during repeated execution necessitates a check point during the loop. This is represented by the State I 140 in FIG. 5. If there are multiple loops following each other in a non-nested way, then a check point is taken at the end of each loop before the start of the next.

An important support needed from the check-pointing operation itself is that it has to be atomic. All check points are done in the form of transactions, i.e. a check point is either completed and committed or else it is rolled back to the previous check point. This can be achieved by using double buffers. In the double buffer concept, first the data is copied to a primary buffer and then the data is copied to a main buffer. If the copy to the primary buffer fails then data in the main buffer has not been destroyed. If the copy to the main buffer fails then the data can be restored from the primary buffer. This ensures that the data written to the main buffer is always in a consistent state. Also, the first check pointing operation takes a back up of all the data pages and the subsequent check pointing operation takes a back up of dirty, i.e. modified, data pages only.

Check pointing essentially refers to backing up only the data pages associated with the process. All check pointing is done in memory, i.e. the check point data is copied to another location in the memory. This can be achieved by the use of an additional memory segment called the back-up segment, which is used to back up all data and stack segments of a process. Segments are used to separate program memory space into different parts so as to have logical separation and separation for security. Even though the initial copy is done in memory, the page replacement algorithms may swap the pages out to the hard disk, hence this will not increase the memory footprint of the process to a large extent. In other words, memory pages used for transactions are not locked up.

In order to conserve memory used for the back-up segments, only those data pages that are present in memory are copied. Not all pages of the data segment will be present at a given point in time. Whenever a page fault occurs on a data page, the page retrieval will cause the data page to be copied to the back-up segment. When a page is swapped out, the corresponding data page within the back-up segment will also be invalidated. The back-up or duplication of pages must be done periodically in order to save the data. It cannot be done for every write since the amount of time required to write data to memory would essentially double, adding to the delay. Reliability needs to be balanced against the cost of achieving it. So there is a need to determine an optimum method so that the back-up operation does not cause a very large delay. The back-up of data is therefore done at transaction boundaries.

To detect whether a given process is checkpointed, the operating system determines whether it has a backup segment, from which a suspended process can be restored.

Figure 5:
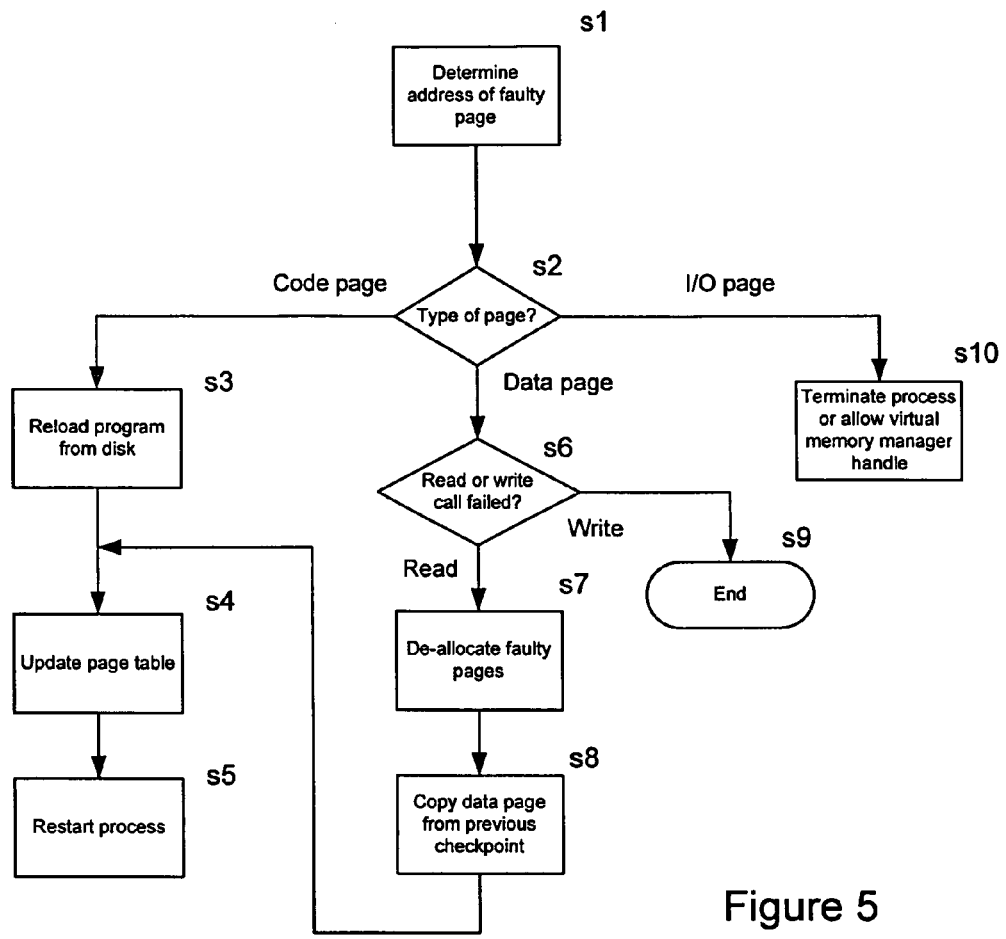
FIG. 5 is a flow diagram illustrating the process of recovery from memory errors according to an embodiment of the invention.
Figure 6:
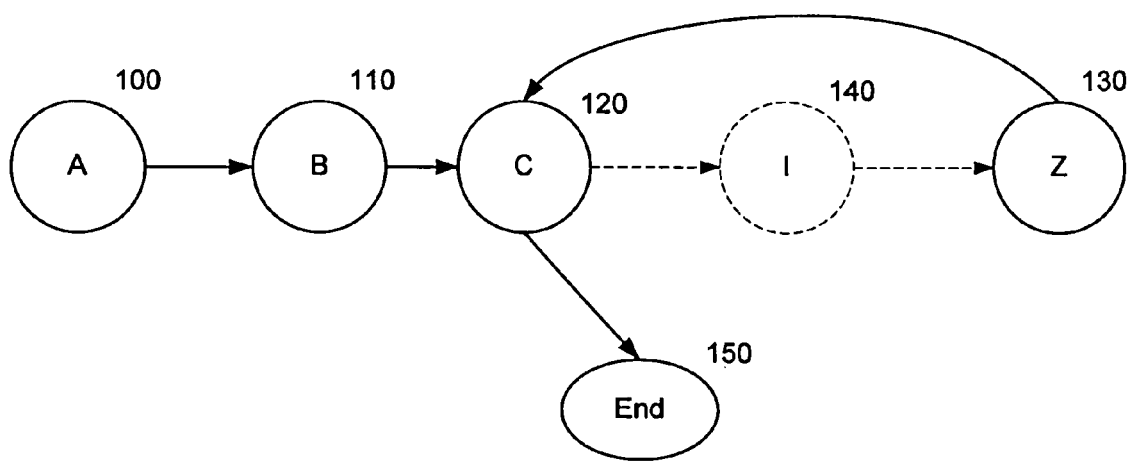
FIG. 6 illustrates the design of a process to minimise loss due to fatal errors according to an embodiment of the invention.

As an example, most daemons can be modified to represented in the form of a state diagram as shown in FIG. 5. A daemon is a program that runs unattended in the background to perform a standard service. For example, considering the example of an HTTP server, whose code could be simplified as follows:
    while TRUE

```
    {
        select (...); //wait for request on port 80
        process_the_request ( );
    }
```

In this example, the check point at the start of the while loop would suffice. Any failure within the loop is a failure of the particular transaction that was requested.

Embodiments of the disclosed technique have been described above by way of example only. It would be apparent to the skilled person that modifications to these embodiments can be made within the scope of the appended claims.

The invention claimed is:

1. A method of recovering from a fatal error in a system having a plurality of components, the system including a plurality of processors for executing a plurality of processes, the method comprising;
    receiving information relating to an error in the system;
    determining which of the components caused the error;
    isolating processes affected by the error;
    recovering from the error;
    in the event that the error is in one of the processors, disassociating all processes assigned to the processor in error;
    moving the processes assigned to the processor in error to one of the other of the plurality of processors except for processes that requested to be scheduled on the processor in error; and
    shutting down the processes that requested to be scheduled on the processor in error, wherein the receiving, the determining, the isolating, the recovering, the disassociating, the moving, and the shutting down are performed by a program that resides in firmware of the system without requiring intervention by a host operating system.

2. A method according to claim 1, further comprising determining which of the plurality of executing processes are affected processes.

3. A method according to claim 1, further comprising saving the context of a currently running process.

4. A method according to claim 3, wherein the processor in error includes registers, further comprising saving the state of the registers.

5. A method according to claim 3, comprising suspending the currently running process.

6. A method according to claim 5, further comprising saving the state of the processor in error at the point of suspension.

7. A method according to claim 2, wherein the system includes memory, and in the event that the error is in the memory, the step of determining the affected processes comprises determining the physical address of the memory error.

8. A method according to claim 7, further comprising determining the virtual address and the process identifier from the physical address.

9. A method according to claim 8, wherein the virtual address identifies a memory page that includes the error, further comprising deallocating the page so that it is inaccessible on a subsequent system boot.

10. A method according to claim 2, wherein the system includes a plurality of I/O devices, each of the I/O devices being associated with a queue of processes requiring access to a respective device, wherein in the event that the error is in one of the I/O devices, the step of determining the affected processes comprises accessing the device queue.

11. A method according to claim 1, wherein the hardware system includes an I/O module that supports a plurality of devices, each of the I/O devices being associated with a queue of processes requiring access to a respective device, wherein in the event that the error is in the I/O module, suspending all processes waiting for access to each of the I/O devices.

12. An error handler for recovering from a fatal error in a system having a plurality of components, the system including a plurality of processors for executing a plurality of processes and means for detecting an error in the system, the error handler comprising:
    means for determining which of the components caused the error;
    means for isolating processes affected by the error;
    means for recovering from the error comprising:
        means for, in the event that the error is in one of the processors,
    disassociating all processes assigned to the processor in error;
        means for moving the processes assigned to the processor in error to one of the other of the plurality of processors except for processes that requested to be scheduled on the processor in error; and
        means for shutting down the processes that requested to be scheduled on the processor in error, wherein the receiving, the determining, the isolating, the recovering, the disassociating, the moving, and the shutting down are performed by a program that resides in firmware of the system without requiring intervention by a host operating system.

13. An error handler according to claim 12, wherein the means for determining which of the components caused the error comprises:
    means for storing error reports at each of the components;
    means for retrieving the error reports; and
    means for analyzing the error reports.

14. A method of recovering from a fatal error in a system having a plurality of components, the components including a memory, the system including a processor for executing a plurality of processes, the method comprising:

receiving, performed by a program that resides in firmware of the system without requiring intervention by a host operating system, information relating to an error in the system;

determining, performed by the program that resides in the firmware without requiring intervention by a host operating system, which of the components caused the error;

isolating, performed by the program that resides in the firmware without requiring intervention by a host operating system, processes affected by the error;

recovering, performed by the program that resides in the firmware without requiring intervention by a host operating system, from the error;

determining, performed by the program that resides in the firmware without requiring intervention by a host operating system, which of the plurality of executing processes are affected processes;

in the event that the error is in the memory, determining the affected processes comprises determining the physical address of the memory error, wherein the determining of the affected processes is performed by the program that resides in the firmware without requiring intervention by a host operating system;

determining, performed by the program that resides in the firmware without requiring intervention by a host operating system, the virtual address and the process identifier from the physical address, wherein the virtual address identifies a memory page that includes the error; and deallocating, performed by the program that resides in the firmware without requiring intervention by a host operating system, the page so that it is inaccessible on a subsequent system boot using a deallocation table containing an entry for each memory page that has been deallocated due to an error.

* * * * *